(12) United States Patent
Cao et al.

(10) Patent No.: US 10,708,883 B2
(45) Date of Patent: *Jul. 7, 2020

(54) DOWNLINK DATA NOTIFICATION MESSAGE SENDING METHOD, AND APPARATUS

(71) Applicant: Huawei Technologies Co., Ltd., Shenzhen (CN)

(72) Inventors: Longyu Cao, Shanghai (CN); Lin Shu, Shanghai (CN); Yanping Zhang, Shanghai (CN)

(73) Assignee: Huawei Technologies Co., Ltd., Shanzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/451,609

(22) Filed: Jun. 25, 2019

(65) Prior Publication Data

US 2019/0320413 A1    Oct. 17, 2019

Related U.S. Application Data

(63) Continuation of application No. 16/009,828, filed on Jun. 15, 2018, now Pat. No. 10,362,557, which is a (Continued)

(51) Int. Cl.
*H04W 68/00* (2009.01)
*H04W 8/08* (2009.01)
(Continued)

(52) U.S. Cl.
CPC ........... *H04W 68/005* (2013.01); *H04W 8/08* (2013.01); *H04W 24/10* (2013.01);
(Continued)

(58) Field of Classification Search
CPC ... H04W 68/00; H04W 68/005; H04W 68/02; H04W 24/02; H04W 76/27; H04L 41/0803
See application file for complete search history.

(56) References Cited

U.S. PATENT DOCUMENTS 8,848,514 B2   9/2014   Kompella et al.
9,596,620 B2   3/2017   Lu et al.
(Continued)

FOREIGN PATENT DOCUMENTS

CN   101001449 A   7/2007
CN   102769932 A   11/2012
(Continued)

OTHER PUBLICATIONS

3GPP TS 23.060 V12.11.0, "3rd Generation Partnership Project; Technical Specification Group Services and System Aspects; General Packet Radio Service (GPRS); Service description; Stage 2 (Release 12)", Dec. 15, 2015. total 352 pages. XP051294432.

(Continued)

Primary Examiner — Nizar N Sivji
(74) Attorney, Agent, or Firm — Slater Matsil, LLP

(57) ABSTRACT

A downlink data notification message sending method and apparatus are disclosed. In an embodiment a method includes receiving, by a user plane network element, a downlink data packet to be sent to a user equipment (UE) and sending, by the user plane network element, an event report message to a control plane network element, wherein the event report message includes a reported event, and wherein the reported event notifies the control plane network element that the downlink data packet matches no bearer.

13 Claims, 7 Drawing Sheets

Related U.S. Application Data continuation of application No. PCT/CN2015/097733, filed on Dec. 17, 2015.

(51) Int. Cl.
*H04W 24/10* (2009.01)
*H04W 40/24* (2009.01)
*H04W 68/04* (2009.01)

(52) U.S. Cl.
CPC ....... *H04W 40/246* (2013.01); *H04W 40/248* (2013.01); *H04W 68/00* (2013.01); *H04W 68/04* (2013.01)

(56) References Cited

U.S. PATENT DOCUMENTS

| | | |
|---|---|---|
| 2011/0286465 A1 | 11/2011 | Koodli et al. |
| 2012/0057496 A1 | 3/2012 | Jin et al. |
| 2012/0236823 A1 | 9/2012 | Kompella et al. |
| 2014/0050199 A1 | 2/2014 | Chen et al. |
| 2014/0372591 A1 | 12/2014 | Payette et al. |
| 2015/0282083 A1 | 10/2015 | Jeong et al. |
| 2016/0135063 A1* | 5/2016 | Ham .................. H04W 4/02 370/328 |
| 2016/0174097 A1 | 6/2016 | Persson et al. |

FOREIGN PATENT DOCUMENTS

| | | |
|---|---|---|
| CN | 103546968 A | 1/2014 |
| CN | 103581888 A | 2/2014 |
| CN | 104782170 A | 7/2015 |
| KR | 20130130839 A | 12/2013 |
| KR | 20150039642 A | 4/2015 |
| RU | 2540115 C2 | 2/2015 |
| WO | 2007079689 A1 | 7/2007 |
| WO | 2010127609 A1 | 11/2010 |

OTHER PUBLICATIONS

3rd Generation Partnership Project; Technical Specification Group Services and System Aspects; General Packet Radio Service (GPRS) enhancements for Evolved Universal Terrestrial Radio Access Network (E-UTRAN) access (Release 13), 3GPP TS 23.401 V13.5.0 (Dec. 2015), 337 pages.

3GPP TS 29.274 V13.4.0, "3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 13)", Dec. 16, 2015. total 342 pages. XP051062917.

Nokia Networks, et al., " Paging priority setting in the MME", SA WG2 Meeting #107E, S2-150549, Jan. 26-30, 2015, Sorrento, Italy. total 6 pages. XP050940312.

* cited by examiner

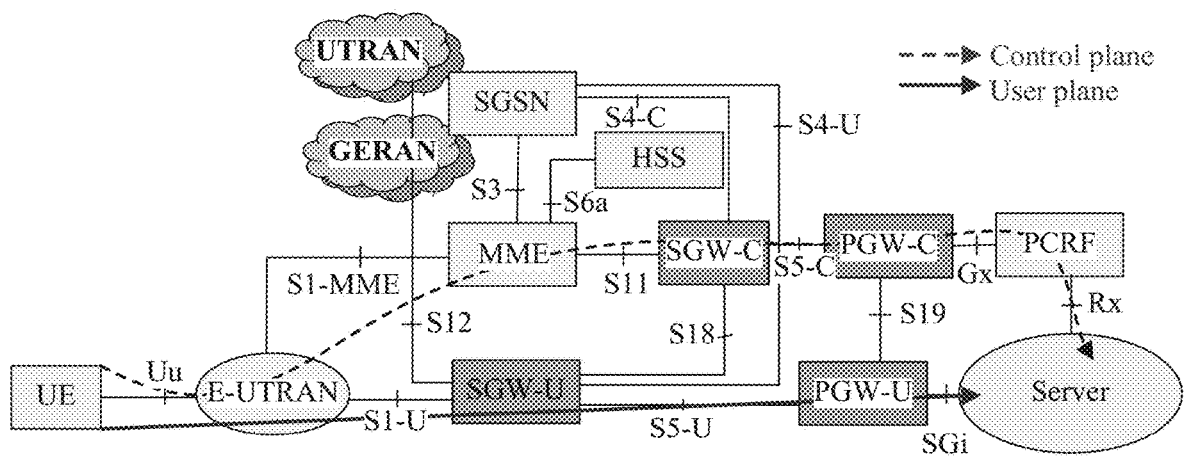

FIG. 3

| 401 | A control plane network element receives a delay instruction sent by a mobility management network element, where the delay instruction is used to instruct the control plane network element to delay sending a DDN message |

| 402 | A user plane network element receives a downlink data packet sent to UE, where the downlink data packet matches no bearer |

| 403 | The user plane network element sends an event report message to the control plane network element, where the event report message includes a reported event, and the reported event is used to notify the control plane network element that the downlink data packet matches no bearer, so that the control plane network element delays sending the DDN message to the mobility management network element |

| 404 | The control plane network element receives the event report message sent by the user plane network element |

| 405 | The control plane network element determines whether the UE is registered in the mobility management network element |

| 406 | If the control plane network element has not received, within a first time period, routing information of a base station sent by the mobility management network element, the control plane network element sends the DDN message to the mobility management network element when the first time period expires, where the routing information of the base station is used to identify a bearer |

FIG. 4

DOWNLINK DATA NOTIFICATION MESSAGE SENDING METHOD, AND APPARATUS

CROSS-REFERENCE TO RELATED APPLICATIONS

This application is a continuation of U.S. patent application Ser. No. 16/009,828, filed on Jun. 15, 2018, which is a continuation of International Application No. PCT/CN2015/097733, filed on Dec. 17, 2015. All of the afore-mentioned patent applications are hereby incorporated by reference in their entireties.

TECHNICAL FIELD

Embodiments of the present invention relates to the communications field, and in particular, to a downlink data notification (DDN) message sending method, and an apparatus.

BACKGROUND

In an evolved packet system (EPS) network, as shown in FIG. 1, a control plane function and a user plane function are integrated in both a serving gateway (SGW) and a packet data network gateway ("PDN GW" or "PGW"), and the serving gateway and the packet data network gateway mainly participate in mobility management and session management, for example, access control, data forwarding, and charging. For idle-state user equipment (UE), because there is no user plane S1 path (in other words, S1-U path) or radio bearer, the UE cannot send an uplink data packet to the network, and when the SGW receives a downlink data packet, the SGW cannot send the downlink data packet to the idle-state UE either. When the SGW receives the downlink data packet and detects that the UE is in an idle state, in other words, there is no S1-U path or radio bearer, the SGW sends a downlink data notification (DDN) message to a mobility management entity (MME), and triggers the MME to start paging the UE. After receiving a paging message, the UE initiates a service request procedure, to request to establish an S1-U path and a radio bearer.

For the MME, there are not many DDN messages for single UE registered in the MME. However, usually, at least tens of thousands of UEs are registered in one MME, and when there are a plurality of idle-state UEs in all UEs registered in the MME, the SGW sends a plurality of DDN messages to the MME, causing a great signaling load to the MME. In a current system art, if an MME requests an SGW to delay sending a DDN message, the MME sends a downlink packet delay notification request to the SGW in a service request procedure initiated by UE. After receiving the request of the MME, if subsequently receiving downlink data of idle-state UE registered in the MME, the SGW no longer directly sends a DDN message to the corresponding MME, but sets a timer based on the request of the MME, to buffer the received downlink data.

With evolution of network architectures, an architecture based on a distributed gateway (DGW) is an enhanced network architecture proposed based on an existing EPS network architecture and based on an idea of control/user (C/U) separation of a network function. The C/U separation refers to decoupling a control plane function and a user plane function of a gateway, and the enhanced network architecture includes a control plane gateway (CGW) and a user plane gateway (UGW). The DGW is a distributed UGW. The CGW is a centralized control plane gateway, integrates control plane functions of an SGW and a PGW in an EPS network, and is configured to process control plane signaling. The DGW integrates user plane functions of the SGW and the PGW in the EPS network, and is configured to process user plane data. The DGW implements user plane data processing, for example, user data packet forwarding, under control and management of the CGW. When a downlink data packet of idle-state UE received by the DGW matches no S1-U path or radio bearer, the DGW reports the event to the CGW, to trigger the CGW to send a DDN message to an MME, so that the MME starts to page the UE. However, in an architecture of the distributed gateway, a user plane gateway is at a relatively low location, and is deployed in a location relatively close to UE, and a service range of the user plane gateway is far smaller than a service range of the MME. Therefore, all UEs in one MME may connect to a plurality of different user plane gateways. Delaying a DDN message is an MME-based granularity operation, and for one user plane gateway, UE served by the user plane gateway may be registered in a plurality of MMEs. However, in a case of C/U separation, the user plane gateway is unaware of an MME in which the UE is registered. Therefore, in the case of C/U separation, how to send a DDN message is a problem urgently to be resolved.

SUMMARY

Embodiments of the present invention provide a DDN message sending method, an apparatus, and a system, so that DDN message sending can be completed in a case of C/U separation.

According to one aspect, an embodiment of the present invention provides a DDN message sending method. The method includes receiving, by a control plane network element, a delay instruction sent by a mobility management network element, where the delay instruction is used to instruct the control plane network element to delay sending a DDN message. The method also includes receiving, by the control plane network element, an event report message sent by a user plane network element, where the event report message includes a reported event, and the reported event is used to notify the control plane network element that a downlink data packet sent to UE matches no bearer. The method also includes determining, by the control plane network element, that the UE is registered in the mobility management network element. The method also includes, if the control plane network element has not received, within a first time period, routing information of a base station sent by the mobility management network element, sending, by the control plane network element, the DDN message to the mobility management network element when the first time period expires, where the routing information of the base station is used to identify a bearer.

Therefore, the control plane network element can determine, based on the event report message reported by the user plane network element, the mobility management network element in which the UE is registered, so that processing complexity of the user plane network element is lowered. Further, after receiving the delay instruction sent by the mobility management network element, if the control plane network element has not received the routing information of the base station within the first time period, the control plane network element sends the DDN message to the mobility management network element only when the first time period expires, so that DDN message sending is reduced, and signaling load of the mobility management network element is reduced.

In a possible design, the event report message further includes identifier information, and the identifier information is used to determine that the downlink data packet is sent to the UE; and the determining, by the control plane network element, that the UE is registered in the mobility management network element includes: determining, by the control plane network element based on the identifier information and locally stored context information of the UE, that the UE is registered in the mobility management network element. Therefore, the control plane network element can rapidly and accurately determine, based on the identifier information, the corresponding UE for which DDN message sending needs to be delayed.

In a possible design, the delay instruction includes a delay parameter, and after the determining, by the control plane network element, that the UE is registered in the mobility management network element, the method further includes: starting, by the control plane network element, a first timer based on the delay instruction, and configuring timed duration of the first timer to the first time period based on the delay parameter; and sending, by the control plane network element, a first indication message including the first time period to the user plane network element that has started a second timer, where timed duration of the second timer is a second time period, and the first indication message is used by the user plane network element to restart the second timer and configure the timed duration of the second timer to the first time period, or is used by the user plane network element to configure the timed duration of the second timer to a sum of the second time period and the first time period, so that the user plane network element buffers a subsequently received downlink data packet. Therefore, a timer mechanism is set, so that a delaying time by which DDN message sending is delayed can be controlled appropriately, and relatively great impact caused to service experience of a user because a user service cannot be responded to due to a long time delay can be avoided. Further, a method for instructing the user plane network element to reuse the second timer is used, in other words, the timed duration of the second timer is directly extended, so that processing complexity of restarting, by the user plane network element, a timer can be lowered.

In a possible design, before the sending, by the control plane network element, a first indication message including the first time period to the user plane network element that has started a second timer, the method further includes: sending, by the control plane network element, a second indication message to the user plane network element, where the second indication message is used to instruct the user plane network element to configure the timed duration of the second timer to the second time period, so that the user plane network element buffers the downlink data packet within the timed duration of the second timer. Therefore, the control plane network element delivers the second indication message to the user plane network element, so that the second timer does not need to be configured in the user plane network element manually, facilitating configuration of the second timer in the user plane network element and facilitating adjustment on the timed duration of the second timer.

In a possible design, after the starting, by the control plane network element, a first timer based on the delay instruction, the method further includes: if the control plane network element has received, within the first time period, the routing information of the base station sent by the mobility management network element, stopping, by the control plane network element, timing of the first timer, and sending the routing information of the base station to the user plane network element; or if the control plane network element has not received, within the first time period, the routing information of the base station sent by the mobility management network element, sending, by the control plane network element, a third indication message to the user plane network element, where the third indication message is used to instruct the user plane network element to stop timing of the second timer and discard the buffered downlink data packet and the buffered subsequently received downlink data packet. Therefore, the first timer and the second timer are set, so that the time by which DDN message sending is delayed can be controlled appropriately by using the timer mechanism, and the relatively great impact caused to the service experience of the user because the user service cannot be responded to due to the long time delay can be avoided.

In a possible design, the event report message further includes the downlink data packet, or the event report message further includes the downlink data packet and identifier information, and the identifier information is used to determine that the downlink data packet is sent to the UE; and the determining, by the control plane network element, that the UE is registered in the mobility management network element includes: determining, by the control plane network element based on a destination address of the downlink data packet and locally stored context information of the UE, that the UE is registered in the mobility management network element, where the destination address is an (Internet Protocol) IP address of the UE; or determining, by the control plane network element based on the identifier information and locally stored context information of the UE, that the UE is registered in the mobility management network element. Therefore, the control plane network element can rapidly and accurately determine, based on the downlink data packet or the identifier information, the corresponding UE for which DDN message sending needs to be delayed, and determine the mobility management network element of the UE. Further, compared with UE recognition based on the downlink data packet, recognition based on the identifier information enables the control plane network element to rapidly recognize the UE with no need to parse the downlink data packet.

In a possible design, after the receiving, by the control plane network element, an event report message sent by a user plane network element, the method further includes: buffering, by the control plane network element, the downlink data packet. Therefore, a loss of the downlink data packet of the UE can be avoided.

In a possible design, the delay instruction includes a delay parameter, and after the determining, by the control plane network element, that the UE is registered in the mobility management network element, the method further includes: starting, by the control plane network element, a third timer based on the delay instruction, and configuring timed duration of the third timer to the first time period based on the delay parameter; and sending, by the control plane network element, a fourth indication message including the first time period to the user plane network element, where the fourth indication message is used by the user plane network element to start a fourth timer and configure timed duration of the fourth timer to the first time period, so that the user plane network element buffers a subsequently received downlink data packet within the timed duration of the fourth timer; or sending, by the control plane network element, a fourth indication message including a discarding instruction to the user plane network element, where the fourth indication message is used to instruct the user plane network element to discard a subsequently received downlink data packet. Therefore, the third timer and the fourth timer are set, in other words, the timer mechanism is set, so that effective utilization of a network resource can be ensured, and long-time occupation of storage resources of the control plane network element and the user plane network element caused because the downlink data packet is buffered for a long time is avoided.

In a possible design, after the starting, by the control plane network element, the third timer based on the delay instruction, the method further includes: if the control plane network element has received, within the first time period, the routing information of the base station sent by the mobility management network element, stopping, by the control plane network element, timing of the third timer, and sending the routing information of the base station and the buffered downlink data packet to the user plane network element; or if the control plane network element has not received, within the first time period, the routing information of the base station sent by the mobility management network element, discarding, by the control plane network element, the buffered downlink data packet, and sending a fifth indication message to the user plane network element, where the fifth indication message is used to instruct the user plane network element to stop timing of the fourth timer and discard the buffered subsequently received downlink data packet. Therefore, the time by which DDN message sending is delayed can be controlled appropriately by using the timer mechanism, and the relatively great impact caused to the service experience of the user because the user service cannot be responded to due to the long time delay can be avoided.

According to another aspect, an embodiment of the present invention provides a downlink data notification (DDN) message sending method. The method includes: receiving, by a user plane network element, a downlink data packet sent to UE, where the downlink data packet matches no bearer. The method also includes sending, by the user plane network element, an event report message to a control plane network element, where the event report message includes a reported event, and the reported event is used to notify the control plane network element that the downlink data packet matches no bearer, so that the control plane network element delays sending a DDN message to a mobility management network element.

Therefore, the event report message is reported, so that processing complexity of the user plane network element can be lowered, and the control plane network element can delay sending a DDN message to the mobility management network element, reducing DDN message sending, and reducing signaling load of the mobility management network element.

In a possible design, the event report message further includes identifier information, and the identifier information is used to determine that the downlink data packet is sent to the UE, so that the control plane network element determines, based on the identifier information and locally stored context information of the UE, that the UE is registered in the mobility management network element. Therefore, the control plane network element can rapidly and accurately determine, based on the identifier information, the UE corresponding to the reported event and the mobility management network element in which the UE is registered.

In a possible design, after the receiving, by a user plane network element, a downlink data packet sent to UE, the method further includes: starting, by the user plane network element, a timer, where timed duration of the timer is a second time period; and buffering the downlink data packet within the timed duration of the timer. Therefore, when it is ensured that the downlink data packet is not lost, compared with that the downlink data packet is sent to the control plane network element for buffering, when the user plane network element buffers the downlink data packet, a network transmission amount can be reduced.

In a possible design, before the receiving, by a user plane network element, a downlink data packet sent to UE, the method further includes: receiving, by the user plane network element, a second indication message sent by the control plane network element, where the second indication message is used to instruct the user plane network element to configure the timed duration of the timer to the second time period. Therefore, the timer does not need to be configured in the user plane network element manually, facilitating timing setting performed by the control plane network element for the user plane network element.

In a possible design, after the sending, by the user plane network element, an event report message to a control plane network element, the method further includes: receiving, by the user plane network element, a first indication message sent by the control plane network element, where the first indication message includes a first time period; restarting, by the user plane network element, the timer and configuring the timed duration of the timer to the first time period based on the first indication message; or configuring, by the user plane network element, the timed duration of the timer to a sum of the second time period and the first time period based on the first indication message; and buffering, by the user plane network element, a subsequently received downlink data packet based on the timed duration of the timer. Therefore, a timer mechanism is set, so that the user plane network element can buffer the downlink data packet based on duration setting of the timer, ensuring that the downlink data packet is not lost, and avoiding relatively great impact caused to service experience of a user because a user service cannot be responded to due to long-time buffering. Further, a method for reusing the timer in the user plane network element is further provided, in other words, the timed duration of the timer is extended, so that processing complexity of restarting, by the user plane network element, the timer can be lowered.

In a possible design, the method further includes: if the user plane network element has received, within the timed duration of the timer, routing information of a base station sent by the control plane network element, stopping, by the user plane network element, timing of the timer, and sending the buffered downlink data packet and the buffered subsequently received downlink data packet to the UE, where the routing information of the base station is used to identify a bearer. Alternatively, if the user plane network element has received, within the timed duration of the timer, a third indication message sent by the control plane network element, stopping, by the user plane network element, timing of the timer and discarding the buffered downlink data packet and the buffered subsequently received downlink data packet based on the third indication message. Therefore, a time for which the user plane network element buffers the downlink data packet can be controlled appropriately by using the timer mechanism, and the relatively great impact caused to the service experience of the user because the user service cannot be responded to due to long-time timing setting can be avoided.

In a possible design, the event report message further includes the downlink data packet, or the event report message further includes the downlink data packet and identifier information, and the identifier information is used to determine that the downlink data packet is sent to the UE, so that the control plane network element determines, based on a destination address of the downlink data packet and locally stored context information of the UE, that the UE is registered in the mobility management network element, where the destination address is an (Internet Protocol) IP address of the UE; or so that the control plane network element determines, based on the identifier information and locally stored context information of the UE, that the UE is registered in the mobility management network element. Therefore, the control plane network element can rapidly and accurately determine the UE corresponding to the reported event. Further, when the identifier information is carried, the control plane network element can rapidly recognize the UE, and does not need to parse the downlink data packet.

In a possible design, after the sending, by the user plane network element, an event report message to a control plane network element, the method further includes: receiving, by the user plane network element, a fourth indication message sent by the control plane network element, where the fourth indication message includes a first time period; starting, by the user plane network element, a timer and configuring timed duration of the timer to the first time period based on the fourth indication message; and buffering, by the user plane network element, a subsequently received downlink data packet within the timed duration of the timer; or receiving, by the user plane network element, a fourth indication message sent by the control plane network element, where the fourth indication message includes a discarding instruction; and discarding, by the user plane network element, a subsequently received downlink data packet based on the fourth indication message. Therefore, the downlink data packet is buffered by using the timer mechanism, so that effective utilization of a network resource can be ensured, and long-time occupation of a storage resource of the user plane network element caused because the user plane network element buffers data for a long time can be avoided.

In a possible design, the method further includes: if the user plane network element has received, within the timed duration of the timer, routing information of a base station and the buffered downlink data packet that are sent by the control plane network element, stopping, by the user plane network element, timing of the timer, and sending the buffered downlink data packet and the buffered subsequently received downlink data packet to the UE, where the routing information of the base station is used to identify a bearer; or if the user plane network element has received, within the timed duration of the timer, a fifth indication message sent by the control plane network element, stopping, by the user plane network element, timing of the timer, and discarding the buffered subsequently received downlink data packet. Therefore, a time for which the user plane network element buffers the downlink data packet can be controlled appropriately by using the timer mechanism, and the relatively great impact caused to the service experience of the user because the user service cannot be responded to due to long-time data buffering can be avoided.

According to still another aspect, an embodiment of the present invention provides a control plane network element. The control plane network element has a function of implementing behaviors of the control plane network element in the foregoing method designs. The function may be implemented by using hardware, or may be implemented by hardware executing corresponding software. The hardware or software includes one or more modules corresponding to the function.

In a possible design, a structure of the control plane network element includes a processor and a network interface. The processor is configured to support the control plane network element in performing corresponding functions in the method, and the network interface is configured to support communication between the control plane network element and a user plane network element and communication between the control plane network element and a mobility management network element. For example, the processor is configured to receive, by using the network interface, a delay instruction sent by the mobility management network element, where the delay instruction is used to instruct the control plane network element to delay sending a DDN message. The processor is further configured to receive, by using the network interface, an event report message sent by the user plane network element, where the event report message includes a reported event, and the reported event is used to notify the control plane network element that a downlink data packet sent to UE matches no bearer. The processor is further configured to determine that the UE is registered in the mobility management network element. The processor is further configured to: if the control plane network element has not received, within a first time period, routing information of a base station sent by the mobility management network element, send the DDN message to the mobility management network element by using the network interface when the first time period expires, where the routing information of the base station is used to identify a bearer. The control plane network element may further include a memory. The memory is configured to be coupled to the processor and stores a program instruction and data that are required by the control plane network element.

According to still another aspect, an embodiment of the present invention provides a user plane network element. The user plane network element has a function of implementing behaviors of the user plane network element in the foregoing method designs. The function may be implemented by using hardware, or may be implemented by hardware executing corresponding software. The hardware or software includes one or more modules corresponding to the function.

In a possible design, a structure of the user plane network element includes a processor and a network interface. The processor is configured to support the user plane network element in performing corresponding functions in the foregoing method, and the network interface is configured to support communication between the user plane network element and a control plane network element. For example, the processor is configured to receive, by using the network interface, a downlink data packet sent to UE, where the downlink data packet matches no bearer. The processor is further configured to send an event report message to the control plane network element by using the network interface, where the event report message includes a reported event, and the reported event is used to notify the control plane network element that the downlink data packet matches no bearer, so that the control plane network element delays sending a DDN message to a mobility management network element. The user plane network element may further include a memory. The memory is configured to be coupled to the processor and stores a program instruction and data that are required by the user plane network element.

According to still another aspect, an embodiment of the present invention provides a communications system. The system includes the control plane network element and the user plane network element in the foregoing aspects.

According to yet another aspect, an embodiment of the present invention provides a computer storage medium, configured to store a computer software instruction used by the control plane network element, where the computer software instruction includes a program designed to perform the foregoing aspect.

According to yet another aspect, an embodiment of the present invention provides a computer storage medium, configured to store a computer software instruction used by the user plane network element, where the computer software instruction includes a program designed to perform the foregoing aspect.

Compared with the prior art, in the solutions provided in the present invention, DDN message sending can be completed in a case of C/U separation, lowering processing complexity of the user plane network element. Further, DDN message sending can be reduced, reducing signaling load of the mobility management network element.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 3 is a schematic diagram of another EPS network architecture according to an embodiment of the present invention;

FIG. 4 is a schematic flowchart of a DDN message sending method according to an embodiment of the present invention;

DETAILED DESCRIPTION OF ILLUSTRATIVE EMBODIMENTS

The following describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

A network architecture and a service scenario that are described in the embodiments of the present invention are intended to describe the technical solutions of the embodiments of the present invention more clearly, but do not constitute a limitation to the technical solutions provided in the embodiments of the present invention. A person of ordinary skill in the art may learn that as the network architecture evolves and a new service scenario emerges, the technical solutions provided in the embodiments of the present invention are also applicable to similar technical problems.

The technical solutions of the embodiments of the present invention may be applied to a network architecture in which a control plane function and a user plane function of gateway functions are decoupled, in other words, are applied to a network architecture in which a control plane function and a user plane function separately form two independent network entities.

A transmission delay of user plane data may be reduced by moving downwards a user plane gateway and deploying a distributed gateway. A conventional gateway is deployed at a very high location. Moving the gateway downwards refers to: moving a deployment location of the gateway downwards, for example, the gateway is deployed at a location relatively close to UE. For example, the gateway may be deployed together with an evolved NodeB (eNB) in a distributed manner. In this way, the UE can rapidly access a packet data network (PDN) by using the gateway that is moved downwards, improving user experience.

Figure 1:
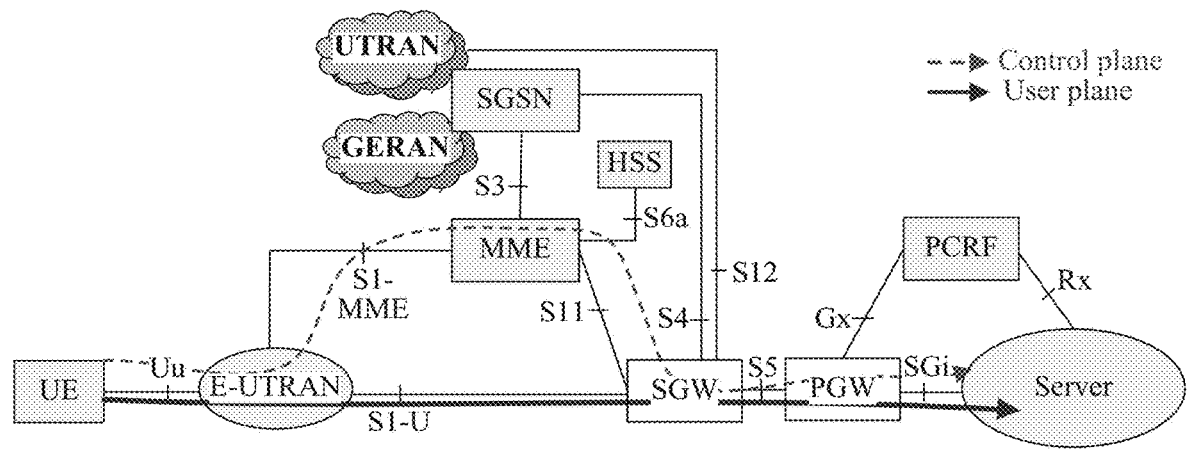
FIG. 1 is a schematic diagram of an EPS network architecture in a current system.
Figure 2:
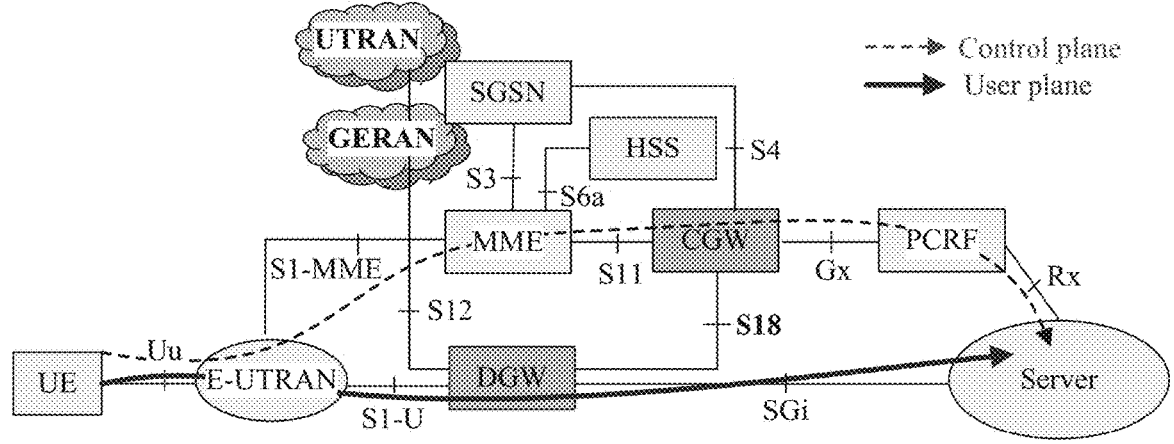
FIG. 2 is a schematic diagram of an EPS network architecture according to an embodiment of the present invention.

FIG. 2 is a schematic diagram of an EPS network architecture according to an embodiment of the present invention. The EPS network architecture includes a DGW and a CGW. In FIG. 2, an interface between the CGW and the DGW is an S18 interface. The S18 interface may use an interface protocol between an SGW and a PGW in an existing EPS network architecture, for example, the General Packet Radio Service (GPRS) Tunneling Protocol ("GPRS Tunneling Protocol" or "GTP"), or may use another interface protocol or a newly defined protocol. This is not limited in this embodiment of the present invention. In the network architecture, other than the introduced CGW, DGW, and S18 interface between the CGW and the DGW, another network element and interface may use a network element and an interface in the existing EPS network architecture. In the network architecture shown in FIG. 2, a transmission path of control plane signaling in an uplink direction starts from UE, sequentially passes through an evolved universal terrestrial radio access network (E-UTRAN), an MME, the CGW, and a policy and charging rules function (PCRF) entity, and finally arrives at a server. A transmission path of user plane data in an uplink direction starts from the UE, sequentially passes through the E-UTRAN and the DGW, and finally arrives at the server.

FIG. 3 is a schematic diagram of another EPS network architecture according to an embodiment of the present invention. The EPS network structure includes control plane gateways: an SGW-C and a PGW-C, and user plane gateways: an SGW-U and a PGW-U. In FIG. 3, an interface between the SGW-C and the SGW-U is an S18 interface, and an interface between the PGW-C and the PGW-U is an S19 interface. The S18 interface may use an interface protocol between an SGW and a PGW in an existing EPS network architecture, for example, GTP, or may use another interface protocol or a newly defined protocol. This is not limited in this embodiment of the present invention. In the network architecture, other than the introduced SGW-C, SGW-U, and S18 interface between the SGW-C and the SGW-U, another network element and interface may use a network element and an interface in the existing EPS network architecture. In the network architecture shown in FIG. 3, a transmission path of control plane signaling in an uplink direction starts from UE, sequentially passes through an E-UTRAN, an MME, the SGW-C, the PGW-C, and a PCRF entity, and finally arrives at a server. A transmission path of user plane data in an uplink direction starts from the UE, sequentially passes through the E-UTRAN, the SGW-U, and the PGW-U, and finally arrives at the server.

The technical solutions of the embodiments of the present invention may be applicable to a scenario of an access manner defined by the 3rd Generation Partnership Project (3GPP), or may be applicable to a scenario of a non-3GPP access manner. The embodiments of the present invention are described by using an EPS network architecture in a scenario of a 3GPP access manner as an example.

The following further describes in detail the embodiments of the present invention based on the foregoing common aspects of the present invention.

The embodiments of the present invention provide a DDN message sending method, and a control plane network element and a user plane network element that are based on the method. The control plane network element may be a control plane gateway or another control plane management entity, and the user plane network element may be a user plane gateway or another user plane management entity. The control plane network element receives a delay instruction sent by a mobility management network element, where the delay instruction is used to instruct the control plane network element to delay sending a DDN message. The user plane network element receives a downlink data packet sent to UE, where the downlink data packet matches no bearer. The user plane network element sends an event report message to the control plane network element, where the event report message includes a reported event, and the reported event is used to notify the control plane network element that the downlink data packet matches no bearer, so that the control plane network element delays sending the DDN message to the mobility management network element. Correspondingly, the control plane network element receives the event report message sent by the user plane network element. After the control plane network element determines that the UE is registered in the mobility management network element, if the control plane network element has not received, within a first time period, routing information of a base station sent by the mobility management network element, the control plane network element sends the DDN message to the mobility management network element when the first time period expires, and the routing information of the base station is used to identify a bearer.

In the technical solutions of the embodiments of the present invention, if the user plane network element receives a downlink data packet of idle-state UE, the user plane network element sends an event report message to the control plane network element, the control plane network element determines, based on a DDN message sending delay instruction of the mobility management network element and the event report message, whether to delay sending a DDN message to the mobility management network element, and if DDN message sending needs to be delayed, the control plane network element delays sending the DDN message.

The following describes, with reference to FIG. 4, the solutions provided in the embodiments of the present invention.

FIG. 4 is a schematic flowchart of a DDN message sending method according to an embodiment of the present invention. As shown in FIG. 4, the method includes the following steps.

401. A control plane network element receives a delay instruction sent by a mobility management network element, where the delay instruction is used to instruct the control plane network element to delay sending a DDN message.

In an example, the delay instruction is a downlink packet delay notification request. The control plane network element receives a bearer modification request message sent by the mobility management network element, and the bearer modification request message carries the downlink packet delay notification request. Optionally, the downlink packet delay notification request further carries a delay parameter, and the delay parameter represents a time length.

402. A user plane network element receives a downlink data packet sent to UE, where the downlink data packet matches no bearer.

In an example, the user plane network element uses an idle-state UE data buffering mechanism. Using the user plane network element as an example, the idle-state UE data buffering mechanism means that because a downlink data packet sent to idle-state UE matches no bearer, the downlink data packet cannot be sent to the UE, and when the user plane network element receives the downlink data packet sent to the idle-state UE, the user plane network element buffers the downlink data packet. Therefore, when the user plane network element buffers the downlink data packet, a downlink data packet loss can be avoided. For example, before receiving the downlink data packet, the user plane network element locally configures a second timer, and timed duration of the second timer is a second time period. Alternatively, before the user plane network element receives the downlink data packet, the control plane network element sends a second indication message to the user plane network element, and the second indication message is used to instruct the user plane network element to configure timed duration of a second timer to a second time period, and correspondingly, the user plane network element receives the second indication message sent by the control plane network element, and configures the timed duration of the second timer to the second time period based on the second indication message. When receiving the downlink data packet sent to the idle-state UE, the user plane network element starts the local second timer, and starts to buffer the downlink data packet within the timed duration of the timer. Therefore, the second timer is set, so that the user plane network element can buffer the downlink data packet based on duration setting of the second timer, ensuring that the downlink data packet is not lost, and avoiding relatively great impact caused to service experience of a user because a user service cannot be responded to due to long-time buffering.

In an example, the user plane network element does not use the idle-state UE data buffering mechanism, but the control plane network element uses the idle-state UE data buffering mechanism. When receiving the downlink data packet, the user plane network element does not buffer the downlink data packet. Further, compared with that the downlink data packet is sent to the control plane network element for buffering, when the user plane network element buffers the downlink data packet, a network transmission amount can be reduced.

403. The user plane network element sends an event report message to the control plane network element, where the event report message includes a reported event, and the reported event is used to notify the control plane network element that the downlink data packet matches no bearer, so that the control plane network element delays sending the DDN message to the mobility management network element.

When the downlink data packet of the UE received by the user plane network element matches no bearer, the user plane network element cannot send the downlink data packet to the UE, and the user plane network element sends the reported event indicating that the downlink data packet matches no bearer to the control plane network element.

In an example, the event report message may further carry identifier information, and the identifier information is used to determine that the downlink data packet is sent to the UE; or the event report message may further carry the downlink data packet, or the downlink data packet and identifier information. For example, when the user plane network element uses the idle-state UE data buffering mechanism, in addition to the reported event, the event report message further carries the identifier information. When the control plane network element uses the idle-state UE data buffering mechanism, because the user plane network element does not buffer the downlink data packet, in addition to the reported event, the event report message further carries the downlink data packet, or further carries the downlink data packet and the identifier information. Therefore, the control plane network element can rapidly and accurately determine, based on the identifier information or the downlink data packet, the UE corresponding to the reported event and the mobility management network element in which the UE is registered. The control plane network element determines the UE based on the identifier information, and may not need to parse the downlink data packet, lowering processing complexity of the control plane network element.

404. The control plane network element receives the event report message sent by the user plane network element.

In an example, when the event report message carries the downlink data packet, the control plane network element buffers the downlink data packet after receiving the event report message, ensuring that the downlink data packet is not lost.

405. The control plane network element determines whether the UE is registered in the mobility management network element.

In an example, the control plane network element determines, based on content carried in the event report message and locally stored context information of the UE, whether the UE is registered in the mobility management network element. For example, when the event report message carries the reported event and the identifier information, the control plane network element determines, based on the identifier information and the locally stored context information of the UE, that the UE is registered in the mobility management network element. When the event report message carries the reported event and the downlink data packet, the control plane network element determines, based on a destination address of the downlink data packet and the locally stored context information of the UE, that the UE is registered in the mobility management network element, and the destination address is an Internet Protocol (IP) address of the UE. It may be understood that when the event report message further carries the identifier information in addition to the reported event and the downlink data packet, the control plane network element may also determine, based on the identifier information and the locally stored context information of the UE, that the UE is registered in the mobility management network element. Therefore, the control plane network element can rapidly and accurately determine, based on the identifier information or the downlink data packet, the mobility management network element in which the UE corresponding to the reported event is registered. The control plane network element determines the mobility management network element corresponding to the UE based on the identifier information, and may not need to parse the downlink data packet, lowering processing complexity of the control plane network element.

In an example, the control plane network element first determines, based on the content carried in the event report message and the locally stored context information of the UE, a mobility management network element in which the UE is registered, and then determines whether the mobility management network element in which the UE is registered matches the mobility management network element sending the delay instruction to the control plane network element, and if they match, the control plane network element determines that the UE is registered in the mobility management network element; or if they do not match, the control plane network element determines that the UE is not registered in the mobility management network element.

In an example, when the user plane network element uses the idle-state UE data buffering mechanism, if the control plane network element determines that the UE is registered in the mobility management network element, the control plane network element starts a first timer based on the delay instruction, and configures timed duration of the first timer to a first time period based on the delay parameter. For example, the first time period may be a time period whose length is one delay parameter, or may be a time period whose length is a sum of a plurality of delay parameters. The control plane network element sends a first indication message including the first time period to the user plane network element, and the first indication message is used by the user plane network element to restart the second timer and configure the timed duration of the second timer to the first time period, or is used by the user plane network element to configure the timed duration of the second timer to a sum of the second time period and the first time period, so that the user plane network element buffers a subsequently received downlink data packet. Correspondingly, the user plane network element receives the first indication message including the first time period and sent by the control plane network element, and restarts the second timer and configures the timed duration of the second timer to the first time period based on the first indication message, or the user plane network element configures the timed duration of the second timer to the sum of the second time period and the first time period based on the first indication message. Subsequently, the user plane network element buffers the subsequently received downlink data packet based on the timed duration of the second timer. Therefore, the first timer is set, so that a delaying time by which the control plane network element delays sending a DDN message can be controlled appropriately; the second timer is set, so that relatively great impact caused to service experience of a user because a user service cannot be responded to due to long-time data buffering of the user plane network element is avoided. Further, a method for instructing the user plane network element to reuse the second timer is used, in other words, the timed duration of the second timer is directly extended, so that processing complexity of restarting, by the user plane network element, a timer can be lowered.

In an example, when the control plane network element uses the idle-state UE data buffering mechanism, if the control plane network element determines that the UE is registered in the mobility management network element, the control plane network element starts a third timer based on the delay instruction, and configures timed duration of the third timer to the first time period based on the delay parameter. The control plane network element sends a fourth indication message including the first time period to the user plane network element, and the fourth indication message is used by the user plane network element to start a fourth timer and configure timed duration of the fourth timer to the first time period, so that the user plane network element buffers the subsequently received downlink data packet within the timed duration of the fourth timer. Alternatively, the control plane network element sends a fourth indication message including a discarding instruction to the user plane network element, and the fourth indication message is used to instruct the user plane network element to discard the subsequently received downlink data packet. Correspondingly, the user plane network element receives the fourth indication message including the first time period and sent by the control plane network element, and the user plane network element starts the fourth timer and configures the timed duration of the fourth timer to the first time period based on the fourth indication message, and buffers the subsequently received downlink data packet within the timed duration of the fourth timer. Alternatively, the user plane network element receives the fourth indication message including the discarding instruction and sent by the control plane network element, and the user plane network element discards the subsequently received downlink data packet based on the fourth indication message. By using the timer mechanism of the control plane network element and the user plane network element, the delaying time by which the control plane network element delays sending the DDN message can be controlled appropriately, so that relatively great impact caused to service experience of a user because a user service cannot be responded to due to long-time data buffering of the control plane network element is avoided. Further, a method for instructing the user plane network element to reuse the fourth timer is used, in other words, the timed duration of the fourth timer is directly extended, so that the processing complexity of restarting, by the user plane network element, a timer can be lowered. Compared with that the control plane network element uses the idle-state UE data buffering mechanism, when the user plane network element uses the idle-state UE data buffering mechanism, a network transmission amount can be reduced, to be specific, the downlink data packet does not need to be sent to the control plane network element by using the user plane network element.

406. If the control plane network element has not received, within a first time period, routing information of a base station sent by the mobility management network element, the control plane network element sends the DDN message to the mobility management network element when the first time period expires, where the routing information of the base station is used to identify a bearer. For example, the routing information of the base station may include a tunnel endpoint identifier (TEID) and address information of the base station.

In an example, when the user plane network element uses the idle-state UE data buffering mechanism, if the control plane network element has received, within the first time period, the routing information of the base station sent by the mobility management network element, the control plane network element stops timing of the first timer, and sends the routing information of the base station to the user plane network element; or if the control plane network element has not received, within the first time period, the routing information of the base station sent by the mobility management network element, the control plane network element sends a third indication message to the user plane network element, and the third indication message is used to instruct the user plane network element to stop timing of the second timer and discard the buffered downlink data packet and the buffered subsequently received downlink data packet. It should be noted that when the first timer expires and the control plane network element has not received the routing information of the base station sent by the mobility management network element, the control plane network element may further restart the first timer, where the timed duration is the first time period or a new specified time period, and resend the first indication message to the user plane network element, where the first indication message is used by the user plane network element to restart the second timer and configure the timed duration of the second timer to the first time period or the new time period, or is used by the user plane network element to configure the timed duration of the second timer to the sum of the second time period and the first time period or a sum of the second time period and the new time period, so that the user plane network element buffers the received downlink data packet. When the control plane network element has not received, within the first time period or the new time period after restarting the first timer, the routing information of the base station sent by the mobility management network element, the control plane network element sends the third indication message to the user plane network element.

In an example, when the control plane network element uses the idle-state UE data buffering mechanism, if the control plane network element has received, within the first time period, the routing information of the base station sent by the mobility management network element, the control plane network element stops timing of the third timer, and sends the routing information of the base station and the downlink data packet buffered by the control plane network element to the user plane network element; or if the control plane network element has not received, within the first time period, the routing information of the base station sent by the mobility management network element, the control plane network element discards the buffered downlink data packet, and sends a fifth indication message to the user plane network element, and the fifth indication message is used to instruct the user plane network element to stop timing of the fourth timer and discard the buffered subsequently received downlink data packet. It should be noted that when the third timer expires and the control plane network element has not received the routing information of the base station sent by the mobility management network element, the control plane network element may further restart the third timer, where the timed duration is the first time period or a new specified time period, and resend the fourth indication message including the first time period or the new time period to the user plane network element, where the fourth indication message is used by the user plane network element to restart the fourth timer and configure the timed duration of the fourth timer to the first time period or the new time period, or is used by the user plane network element to configure the timed duration of the fourth timer to a sum of the second time period and the first time period or a sum of the second time period and the new time period, so that the user plane network element buffers the subsequently received downlink data packet. When the control plane network element has not received, within the first time period or the new time period after restarting the first timer, the routing information of the base station sent by the mobility management network element, the control plane network element sends the fifth indication message to the user plane network element.

In an example, when the user plane network element uses the idle-state UE data buffering mechanism, if the user plane network element has received, within the timed duration of the second timer, the routing information of the base station sent by the control plane network element, the user plane network element stops timing of the second timer, and sends the buffered downlink data packet and the buffered subsequently received downlink data packet to the UE; or if the user plane network element has received, within the timed duration of the second timer, the third indication message sent by the control plane network element, the user plane network element stops timing of the second timer and discards the buffered downlink data packet and the buffered subsequently received downlink data packet based on the third indication message.

In an example, when the control plane network element uses the idle-state UE data buffering mechanism, if the user plane network element has received, within the timed duration of the second timer, the routing information of the base station and the buffered downlink data packet that are sent by the control plane network element, the user plane network element stops timing of the fourth timer, and sends the buffered downlink data packet and the buffered subsequently received downlink data packet to the UE; or if the user plane network element has received, within the timed duration of the second timer, the fifth indication message sent by the control plane network element, the user plane network element stops timing of the fourth timer, and discards the buffered subsequently received downlink data packet.

Therefore, by using the timer mechanism, the delaying time by which the control plane network element delays sending the DDN message can be controlled appropriately, and the relatively great impact caused to the service experience of the user because the user service cannot be responded to due to the long-time data buffering of the control plane network element is avoided. Further, effective utilization of a network resource can be ensured, and long-time occupation of storage resources of the control plane network element and the user plane network element caused because the downlink data packet is buffered for a long time is avoided.

In this embodiment of the present invention, if the control plane network element determines that the UE is registered in the mobility management network element sending the delay instruction, the control plane network element does not directly send the DDN message to the mobility management network element, instead, the control plane network element first determines whether the control plane network element has received, within the first time period, the routing information of the base station sent by the mobility management network element, and if the control plane network element has received the routing information, the control plane network element does not need to send the DDN message to the mobility management network element, so that unnecessary DDN message sending can be reduced, and signaling load of the mobility management network element can be reduced. If the control plane network element has not received, within the first time period, the routing information of the base station sent by the mobility management network element, the control plane network element sends the DDN message to the mobility management network element only when the first time period expires. Relative to processing complexity of a user plane network element in the prior art in which the user plane network element is unaware of a mobility management network element in which UE is registered, in this embodiment of the present invention, the control plane network element can determine, based on the event report message reported by the user plane network element, the mobility management network element in which the UE is registered, to complete DDN message sending, so that the processing complexity of the user plane network element is lowered.

The solution of this embodiment of the present invention may be applied to the network architecture shown in FIG. 2 or FIG. 3. When the solution is applied to the network architecture shown in FIG. 2, the control plane network element may be a CGW, and the user plane network element may be a DGW. When the solution is applied to the network architecture shown in FIG. 3, the control plane network element may be an SGW-C, and the user plane network element may be an SGW-U, or the control plane network element may be a PGW-C, and the user plane network element may be a PGW-U.

The following further describes the embodiments of the present invention based on the network architecture shown in FIG. 2 with reference to more accompanying drawings by using an example in which a control plane network element is a CGW, a user plane network element is a DGW, and a mobility management network element is an MME.

Figure 5:
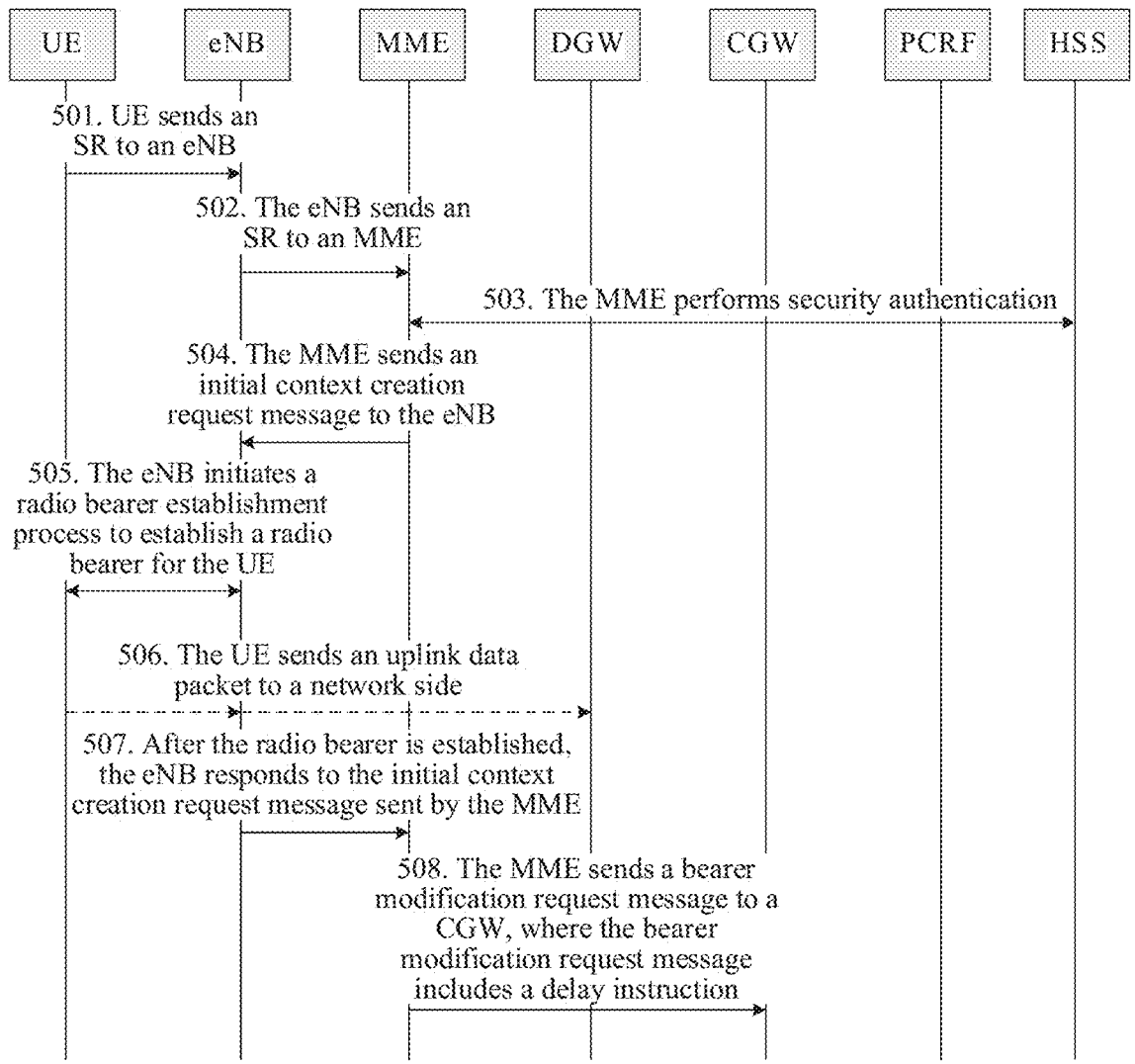
FIG. 5 is a schematic communication diagram of a service request procedure of UE according to an embodiment of the present invention.

FIG. 5 is a schematic communication diagram of a service request procedure according to an embodiment of the present invention.

When UE is in an idle state, if the UE needs to send an uplink data packet or needs to receive a downlink data packet, a service request procedure of the UE is triggered because the idle-state UE does not have a user plane S1 path or radio bearer (RB), in other words, does not have an S1-U or a Uu user plane transmission bearer in FIG. 2 or FIG. 3. An MME may send a delay instruction to a CGW in the service request procedure. The service request procedure is shown in FIG. 5. In step 508, the MME sends a bearer modification request message to the CGW, where the bearer modification request message carries a delay instruction. The delay instruction may be a downlink packet delay notification request. Further, the downlink packet delay notification request may include a delay parameter.

Figure 6:
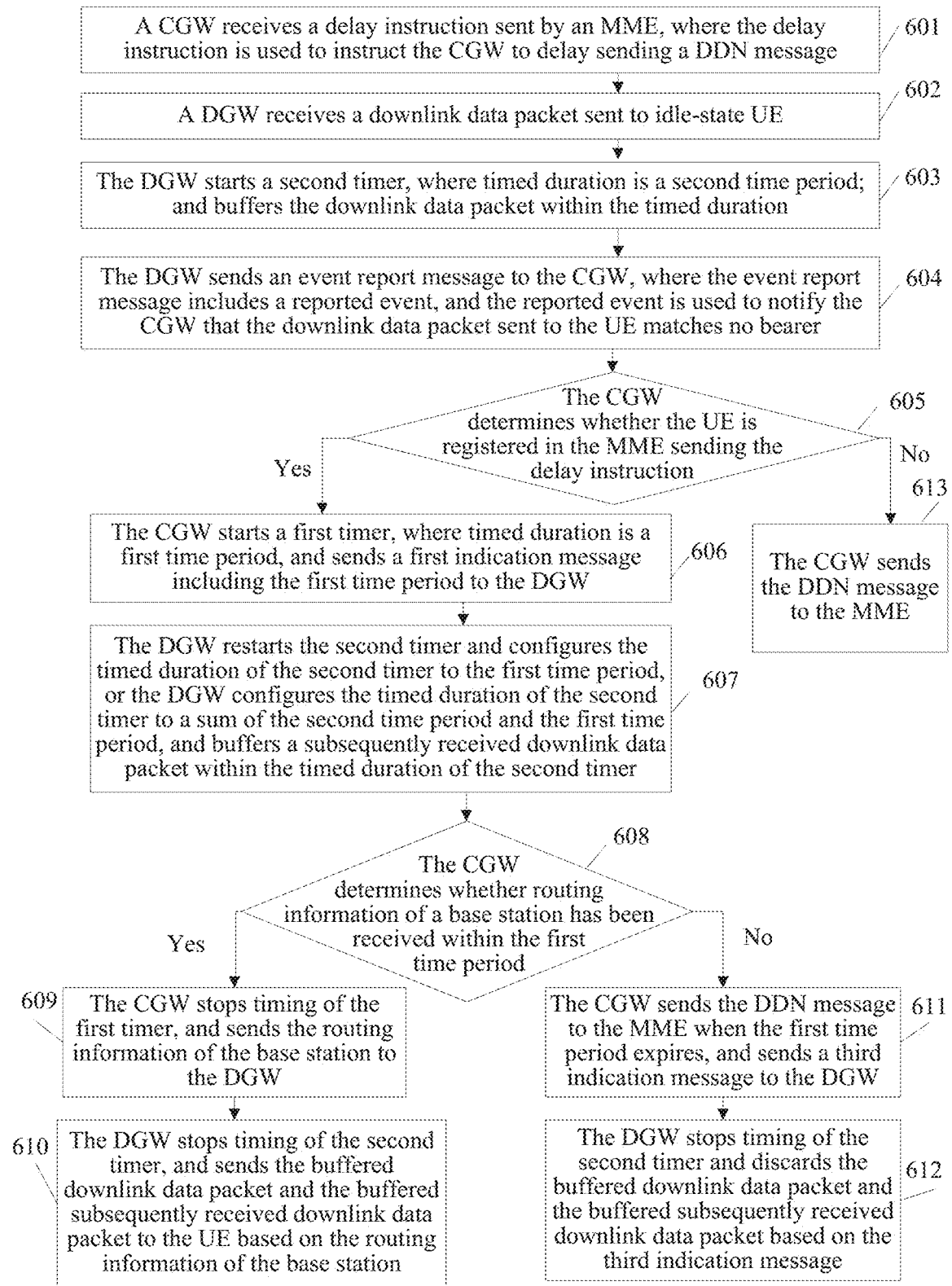
FIG. 6 is a schematic flowchart of another DDN message sending method according to an embodiment of the present invention.

FIG. 6 is a schematic flowchart of another DDN message sending method according to an embodiment of the present invention. In the method shown in FIG. 6, a DGW uses an idle-state UE data buffering mechanism. As shown in FIG. 6, the method includes the following steps.

601. A CGW receives a delay instruction sent by an MME, where the delay instruction is used to instruct the CGW to delay sending a DDN message to the MME.

In an example, the delay instruction is the downlink packet delay notification request carried in the bearer modification request message. Further, the downlink packet delay notification request includes the delay parameter.

602. The DGW receives a downlink data packet sent to idle-state UE.

If the DGW matches the received downlink data packet of the UE to no bearer, for example, the DGW has not received routing information of an eNB, the DGW may determine that the UE is currently in an idle state.

603. The DGW starts a second timer, where timed duration is a second time period; and buffers the downlink data packet within the timed duration.

The DGW uses the idle-state UE data buffering mechanism. The DGW buffers the received downlink data packet and a subsequently received downlink data packet within the timed duration after starting the second timer. A same service of same UE corresponds to a same bearer, to be specific, a base station corresponding to the same service of the same UE has a same TEID and same address information. Therefore, this embodiment of the present invention is described by using a downlink data packet corresponding to a same service of same UE.

In an example, the DGW locally configures the second timer, and the timed duration is the second time period. In this case, the DGW starts the local second timer, and starts to buffer the received downlink data packet and the subsequently received downlink data packet. In another example, the second timer of the DGW is configured by the DGW based on an instruction of the CGW. For example, the CGW may send a second indication message to the DGW in advance by using another message of an S18 interface, and the second indication message is used to indicate that the timed duration of the second timer is the second time period. When the DGW matches the downlink data packet to no bearer, the DGW starts the second timer, and starts to buffer the received downlink data packet. In this way, the second timer does not need to be configured in the DGW manually, and adjustment on the timed duration of the second timer is facilitated.

If the DGW has received, before the second timer of the DGW expires, in other words, within the timed duration of the second timer, routing information of a base station sent by the CGW, the DGW stops timing of the second timer, establishes a corresponding bearer based on the routing information of the base station, and sends the buffered downlink data packet of the UE to the UE by using the corresponding bearer. If the DGW has not received routing information of a base station after the second timer expires, the DGW may discard the buffered downlink data packet of the UE, or the DGW may restart the second timer, and when a quantity of times of starting the second timer exceeds a specified threshold, the DGW no longer starts the second timer, and in this case, discards the buffered downlink data packet of the UE.

604. The DGW sends an event report message to the CGW, where the event report message includes a reported event, and the reported event is used to notify the CGW that the downlink data packet sent to the UE matches no bearer.

In an example, the event report message further includes identifier information, and the identifier information is used to determine that the downlink data packet is sent to the UE. The identifier information may include at least one of a data flow identifier, a bearer identifier, a UE identifier, a PDN connection identifier, or a session identifier (for example, a session ID). For example, the data flow identifier may be a traffic flow template (TFT), the bearer identifier may be an EPS bearer ID, and the UE identifier may be an international mobile subscriber identity (IMSI) or a temporary mobile subscriber identity (TMSI). The event report message may carry one or more of the identifiers. The identifiers may be directly presented in the event report message, or may be presented in another representation form, for example, presented by using another new identifier formed by the identifiers, for example, an object-based object identifier (object ID), including a session object identifier (session object ID), a bearer object identifier (bearer object ID), or the like.

605. The CGW determines whether the UE is registered in the MME sending the delay instruction; and if determining that the UE is registered in the MME, performs step 606; or if determining that the UE is not registered in the MME, performs step 613.

After receiving the event report message sent by the DGW, the CGW may determine, based on the identifier information and context information of the UE that is locally stored in the CGW, UE to which the event is specific, and then determine, based on the context information of the UE, whether the UE is registered in the MME that previously instructs the CGW to delay sending a DDN message, in other words, whether the UE is registered in the MME sending the delay instruction. For example, if the CGW has received the downlink packet delay notification request sent by the MME in which the UE is registered, the CGW determines that the UE is registered in the MME that has instructed the CGW to delay sending a DDN message. If the CGW determines that the UE is registered in an MME that does not instruct the CGW to delay sending a DDN message, in other words, the UE is not registered in the MME sending the delay instruction, the CGW sends a DDN message to the MME, to trigger the MME to page the UE, so that the UE initiates a service request procedure, as shown in FIG. 5.

In an example, an implementation in which the CGW determines, based on the identifier information and the context information of the UE, the UE corresponding to the reported event is: If the reported event sent by the DGW is reported based on a flow granularity, in other words, the DGW adds only the data flow identifier (for example, the TFT) in the event report message, after receiving the identifier information, the CGW first needs to determine a bearer identifier corresponding to the TFT, further determines a PDN connection corresponding to the bearer identifier, and still further, determines UE to which the PDN connection belongs, so as to determine the UE corresponding to the reported event; or if the identifier information reported by the DGW includes the TFT, the EPS bearer ID, and the PDN connection identifier, the CGW determines, based on a combination of the identifiers, the UE corresponding to the reported event; or if the DGW adds the UE identifier in the identifier information, the CGW may directly determine the UE corresponding to the reported event.

606. The CGW starts a first timer, where timed duration is a first time period, and sends a first indication message including the first time period to the DGW.

If the CGW determines that the UE is registered in the MME sending the delay instruction, the CGW starts the local first timer, starts timing based on the delay parameter in the delay instruction, in other words, configures the timed duration of the first timer to the first time period based on the delay parameter, and sends the first indication message including the first time period to the DGW, so that the DGW restarts the second timer or extends the timed duration of the second timer, to continue to buffer the received downlink data packet and the subsequently received downlink data packet.

607. The DGW restarts the second timer and configures the timed duration of the second timer to the first time period, or the DGW configures the timed duration of the second timer to a sum of the second time period and the first time period, and buffers a subsequently received downlink data packet within the timed duration of the second timer.

Based on the description of step 603, if the second timer in the DGW is locally configured by the DGW, the DGW does not know that the CGW has started the first timer for buffering data. In this case, after receiving the first indication message including the first time period and sent by the CGW, the DGW may stop the second timer that has been started for timing in step 603, and restart timing based on the first time period, in other words, reset the duration of the second timer to the first time period indicated by the CGW; or the DGW may add the first time period to the second time period of the second timer, to extend the timed duration of the second timer.

If the second timer in the DGW is configured based on an instruction of the CGW, the CGW already knows that the DGW has started the second timer for buffering data. In this case, the CGW may clearly instruct, by using the first indication message, the DGW to add the first time period to the second time period of the second timer, to extend the timed duration of the second timer, or may clearly instruct the DGW to stop the timing second timer, restart the second timer, and set the duration to the first time period.

When the DGW restarts the second timer and configures the timed duration to the first time period, the DGW may keep timing of the second timer synchronized with timing of the first timer of the CGW. When the DGW extends the second time period by the first time period, rather than restarting the second timer, processing complexity of the second timer can be lowered.

608. The CGW determines whether routing information of a base station has been received within the first time period; and if the routing information has been received, performs step 609; or if the routing information has not been received, performs step 611.

In an example, if the CGW has not received the routing information of the base station within the first time period, in other words, has not received the routing information of the base station within the timed duration of the first timer, the CGW may further restart the first timer, and resend the first indication message to the DGW, to re-perform step 606, step 607, and step 608. When a quantity of times that the CGW starts the first timer exceeds a predetermined threshold, and the CGW still has not received the routing information of the base station, the CGW performs step 611. Timing of the first timer is set, so that long-time occupation of a storage resource of the DGW caused because the DGW buffers data for a long time can be avoided, and a network resource is effectively used.

609. The CGW stops timing of the first timer, and sends the routing information of the base station to the DGW.

If the CGW has received, before the first timer expires, in other words, within the timed duration of the first timer, the routing information of the base station sent by the MME, the CGW stops timing of the first timer, and sends the routing information of the base station to the DGW by using the S18 interface.

610. The DGW stops timing of the second timer, and sends the buffered downlink data packet and the buffered subsequently received downlink data packet to the UE based on the routing information of the base station.

The DGW establishes the corresponding bearer based on the routing information of the base station sent by the CGW, and sends the buffered downlink data packet and the buffered subsequently received downlink data packet to the base station by using the corresponding bearer, and the base station sends the received downlink data packet to the UE.

611. The CGW sends the DDN message to the MME when the first time period expires, and sends a third indication message to the DGW.

If the CGW has not received the routing information of the base station within the first time period, the CGW sends the DDN message to the MME when the first time period expires, to trigger the MME to page the UE, so that the UE performs the service request procedure shown in FIG. 5. The CGW further sends the third indication message to the DGW, and the third indication message is used to instruct the DGW to stop timing of the second timer and discard the buffered downlink data packet and the buffered subsequently received downlink data packet.

612. The DGW stops timing of the second timer and discards the buffered downlink data packet and the buffered subsequently received downlink data packet based on the third indication message.

613. The CGW sends the DDN message to the MME.

In the technical solution of this embodiment of the present invention, on one hand, when the downlink data packet sent to the UE and received by the DGW matches no bearer, the DGW may buffer the downlink data packet based on the idle-state UE data buffering mechanism, and send the reported event and the identifier information to the CGW, so that the CGW determines whether the UE is registered in the MME that sends the delay instruction to the CGW, thereby lowering processing complexity of the DGW. On the other hand, after receiving the reported event and the identifier information that are sent by the DGW, the CGW can determine, based on the identifier information and the locally stored context information of the UE, whether the UE corresponding to the downlink data packet is registered in the MME that sends the delay instruction to the CGW, and if the UE is registered in the MME, the CGW delays sending the DDN message to the MME, so that unnecessary DDN sending can be reduced, and signaling load of the MME can be reduced.

Figure 7A:
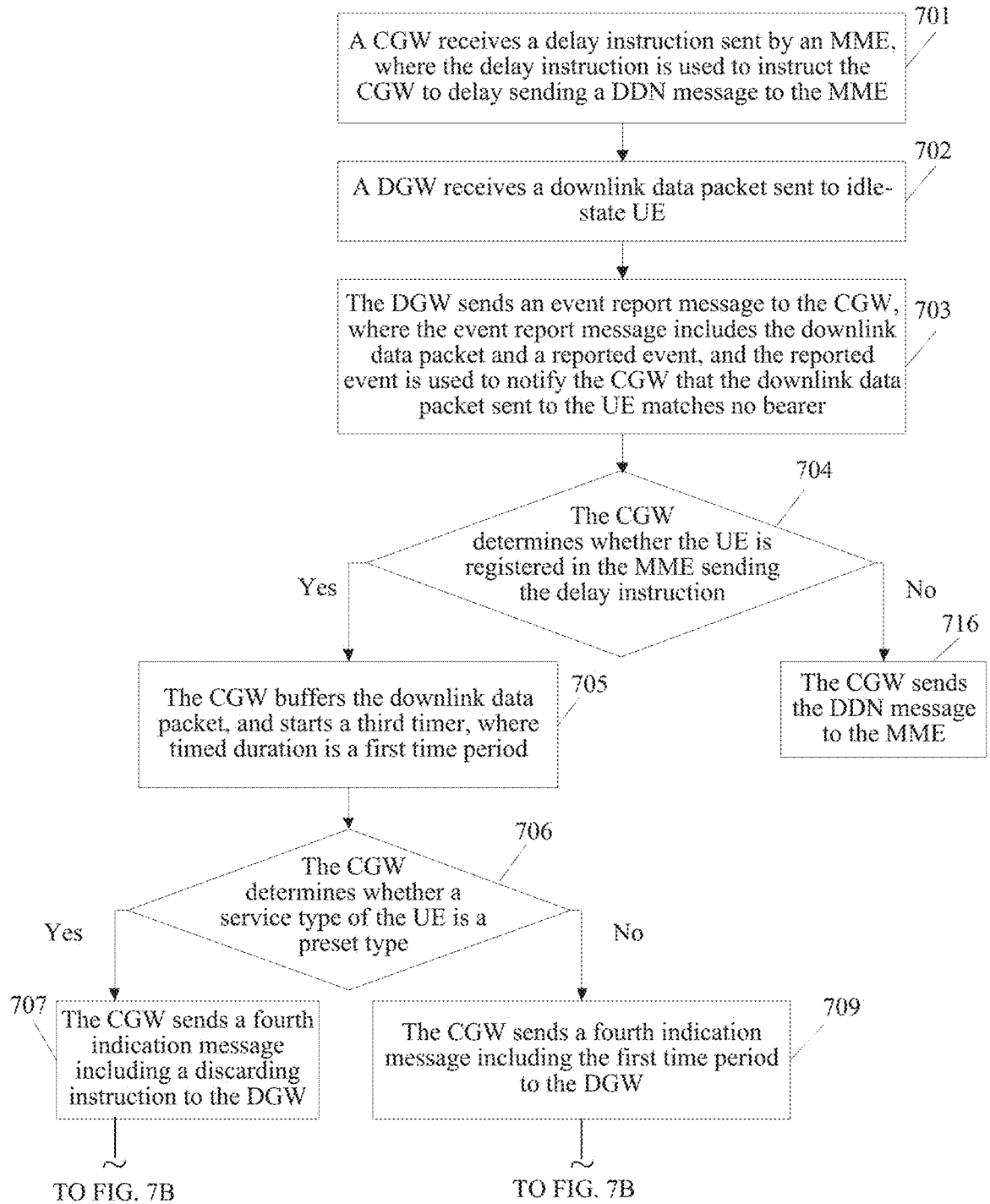
FIG. 7A and FIG. 7B are a schematic flowchart of still another DDN message sending method according to an embodiment of the present invention.
Figure 7B:
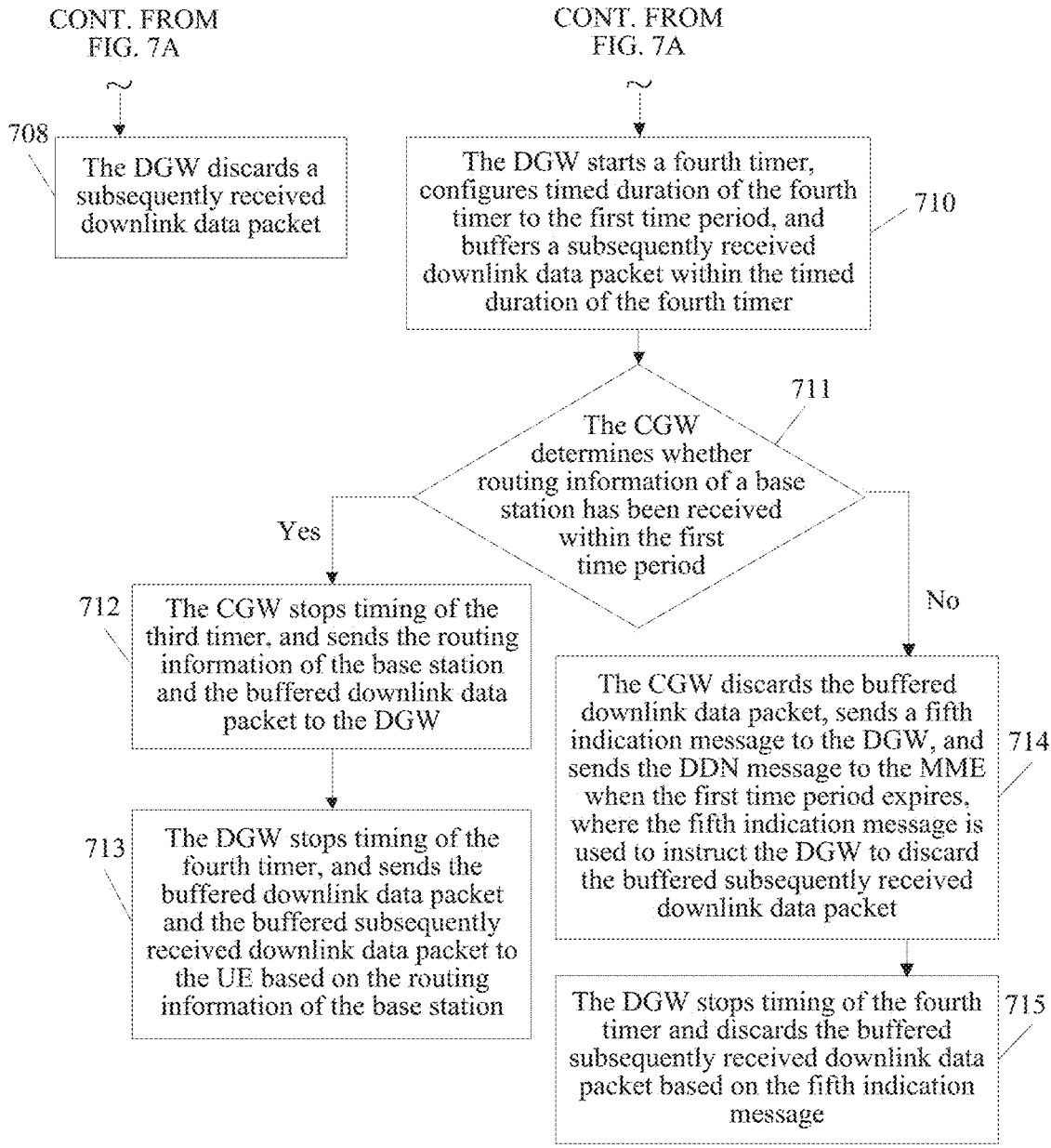

FIG. 7A and FIG. 7B are a schematic flowchart of still another DDN message sending method according to an embodiment of the present invention. In the method shown in FIG. 7A and FIG. 7B, a DGW does not use an idle-state UE data buffering mechanism, but a CGW uses the idle-state UE data buffering mechanism. For other content similar to that in the method shown in FIG. 6, refer to the detailed description in FIG. 6, and details are not described herein again. As shown in FIG. 7A and FIG. 7B, the method includes the following steps.

701 and 702 are respectively similar to 601 and 602 in the method shown in FIG. 6. For details, refer to the detailed descriptions in 601 and 602, and details are not described herein again.

703. The DGW sends an event report message to the CGW, where the event report message includes the downlink data packet and a reported event, and the reported event is used to notify the CGW that the downlink data packet sent to the UE matches no bearer.

In an example, the event report message further includes identifier information, and the identifier information is used to determine that the downlink data packet is sent to the UE. For specific descriptions of the identifier information, refer to the detailed description in 604, and details are not described herein again.

704. The CGW determines whether the UE is registered in the MME sending the delay instruction; and if determining that the UE is registered in the MME, performs step 705; or if determining that the UE is not registered in the MME, performs step 715.

If the event report message carries the identifier information, the CGW may determine, based on the identifier information and locally stored context information of the UE, whether the UE is registered in the MME instructing to delay sending the DDN message. A specific implementation is similar to that in 605, and for details, refer to the detailed description in 605. If the event report message does not carry the identifier information, the CGW may determine, based on a destination address of the downlink data packet and locally stored context information of the UE, the UE corresponding to the received downlink data packet, and further determine whether the corresponding UE is registered in the MME sending the delay instruction, so as to determine whether the CGW needs to delay sending the DDN message. The destination address of the downlink data packet may be an IP address of the UE.

705. The CGW buffers the downlink data packet, and starts a third timer, where timed duration is a first time period.

Duration of the first time period may be duration represented by one delay parameter, or may be duration of a sum of a plurality of delay parameters. In other words, after the CGW sets the third timer based on the delay parameter, if the third timer expires, and the CGW has not received routing information of a base station, the CGW may further restart the third timer, and set the timed duration to the duration indicated in the delay parameter.

706. The CGW determines whether a service type of the UE is a preset type; and if the service type is the preset type, performs step 707; or if the service type is not the preset type, performs step 709.

There may be a plurality of service types, for example, a voice service, a video service, and a short message service. The preset type may be a video service, or may be another preset service. This is not limited in this application. For a video service, a loss of a data packet corresponding to the video service causes relatively small impact to user experience. In this case, a fourth indication message may be used to instruct the DGW to: discard a subsequently received downlink data packet, and continue to send a downlink data packet when the UE is in a connected state. For a voice service, a short message service, and the like, losses of data packets corresponding to the voice service and the short message service cause relatively great impact to user experience. In this case, a fourth indication message may be used to instruct the DGW to start a fourth timer to buffer a subsequently received downlink data packet.

707. The CGW sends a fourth indication message including a discarding instruction to the DGW, where the fourth indication message is used to instruct the DGW to discard a subsequently received downlink data packet.

708. The DGW discards the subsequently received downlink data packet.

In an example, after the CGW sends the discarding instruction to the DGW, when receiving another downlink data packet of a current service of the UE, the DGW directly discards the downlink data packet, in other words, the DGW does not use a buffering mechanism. In this case, when the DGW receives a downlink data packet of the UE, the DGW may add the downlink data packet to the event report message and send the event report message to the CGW, so that the CGW buffers a subsequently received downlink data packet based on the local third timer of the CGW.

709. The CGW sends a fourth indication message including the first time period to the DGW, where the fourth indication message is used by the DGW to start a fourth timer and configure timed duration of the fourth timer to the first time period.

710. The DGW starts the fourth timer, configures the timed duration of the fourth timer to the first time period, and buffers a subsequently received downlink data packet within the timed duration of the fourth timer.

The DGW starts the fourth timer based on the fourth indication message, and if receiving a downlink data packet of the UE subsequently, buffers the subsequently received downlink data packet.

711. The CGW determines whether routing information of a base station has been received within the first time period; and if the routing information has been received, performs step 712; or if the routing information has not been received, performs step 714.

712. The CGW stops timing of the third timer, and sends the routing information of the base station and the buffered downlink data packet to the DGW.

713. The DGW stops timing of the fourth timer, and sends the buffered downlink data packet and the buffered subsequently received downlink data packet to the UE based on the routing information of the base station.

714. The CGW discards the buffered downlink data packet, sends a fifth indication message to the DGW, and sends the DDN message to the MME when the first time period expires, where the fifth indication message is used to instruct the DGW to discard the buffered subsequently received downlink data packet.

715. The DGW stops timing of the fourth timer and discards the buffered subsequently received downlink data packet based on the fifth indication message.

716. The CGW sends the DDN message to the MME, to trigger the MME to page the UE, so that the UE initiates a service request procedure.

For content in 709 to 716 similar to that in 606 to 613 in the method shown in FIG. 6, refer to the detailed descriptions in 606 to 613, and details are not described herein again.

In the technical solution of this embodiment of the present invention, on one hand, when the downlink data packet sent to the UE and received by the DGW matches no bearer, the DGW may send the reported event, the downlink data packet, and the identifier information to the CGW, so that the CGW determines whether the UE is registered in the MME that sends the delay instruction to the CGW, thereby lowering processing complexity of the DGW. On the other hand, after receiving the reported event, the downlink data packet, and the identifier information that are sent by the DGW, the CGW can determine, based on the identifier information and the locally stored context information of the UE, whether the UE corresponding to the downlink data packet is registered in the MME that sends the delay instruction to the CGW, and if the UE is registered in the MME, the CGW delays sending the DDN message to the MME, so that unnecessary DDN sending can be reduced, and signaling load of the MME can be reduced.

It should be noted that the methods in FIG. 5 to FIG. 7A and FIG. 7B may also be applied to the network architecture shown in FIG. 3. When the methods are applied to the network architecture shown in FIG. 3, functions of the CGW may be implemented by using an SGW-C or a PGW-C, and functions of the DGW may be implemented by using an SGW-U or a PGW-U. For a specific implementation process, refer to the detailed descriptions in the methods shown in FIG. 5 to FIG. 7A and FIG. 7B, and details are not described herein again.

The foregoing mainly describes, from the perspective of interaction between network elements, the solutions provided in the embodiments of the present invention. It may be understood that to implement the foregoing functions, the network elements, for example, the control plane network element and the user plane network element, include corresponding hardware structures and/or software modules for executing the functions. A person skilled in the art should be easily aware that units and algorithm steps of the examples described with reference to the embodiments disclosed in this specification can be implemented by hardware or a combination of hardware and computer software in the present invention. Whether a function is performed by hardware or by computer software driving hardware depends on a particular application and design constraint condition of the technical solutions. A professional technician may implement the described function for particular applications by using different methods. However, this implementation should not be construed beyond the scope of the present invention.

Figure 8:
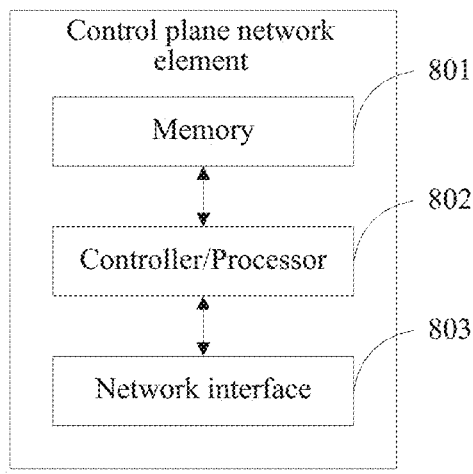
FIG. 8 is a schematic structural diagram of a control plane network element according to an embodiment of the present invention.

FIG. 8 is a schematic structural diagram of a control plane network element included in the foregoing embodiments. The control plane network element may be a CGW in the network architecture shown in FIG. 2, or may be an SGW-C or a PGW-C in the network architecture shown in FIG. 3.

The control plane network element includes a controller/processor 802, configured to control and manage actions of the control plane network element. For example, the controller/processor 802 is configured to support the control plane network element in performing the processes 401, 404, 405, and 406 in FIG. 4, the process 503 in FIG. 5, the processes 601, 605, 606, 608, 609, 611, and 613 in FIG. 6, the processes 701, 704, 705, 706, 707, 709, 711, 712, 714, and 716 in FIG. 7A and FIG. 7B, and/or other processes of the technology described in the embodiments of the present invention. A memory 801 is configured to store program code and data used for the control plane network element. A network interface 803 is configured to support communication between the control plane network element and another network entity. For example, the network interface 803 is configured to support communication between the control plane network element and the user plane network element in FIG. 9. For another example, the network interface 803 is configured to support communication between the control plane network element and each network entity shown in FIG. 2 or FIG. 3.

Figure 9:
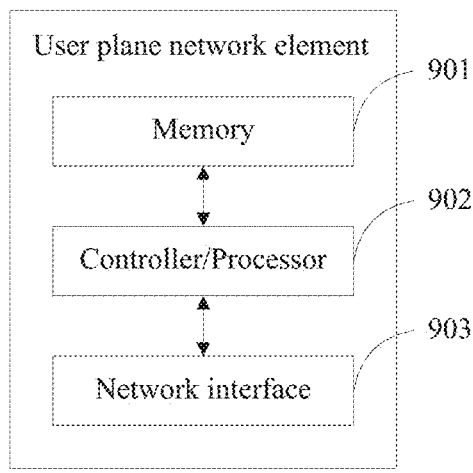
FIG. 9 is a schematic structural diagram of a user plane network element according to an embodiment of the present invention.

FIG. 9 is a schematic structural diagram of a user plane network element included in the foregoing embodiments. The user plane network element may be a DGW in the network architecture shown in FIG. 2, or may be an SGW-U or a PGW-U in the network architecture shown in FIG. 3.

The user plane network element includes a controller/processor 902, configured to control and manage actions of the user plane network element. For example, the controller/processor 902 is configured to support the user plane network element in performing the processes 402 and 403 in FIG. 4, the process 503 in FIG. 5, the processes 602, 603, 604, 607, 610, and 612 in FIG. 6, the processes 702, 703, 708, 710, 713, and 715 in FIG. 7A and FIG. 7B, and/or other processes of the technology described in the embodiments of the present invention. A memory 901 is configured to store program code and data used for the user plane network element. A network interface 903 is configured to support communication between the user plane network element and another network entity. For example, the network interface 903 is configured to support communication between the user plane network element and the control plane network element in FIG. 8. For another example, the network interface 903 is configured to support communication between the user plane network element and each network entity shown in FIG. 2 or FIG. 3.

The controller/processor configured to execute functions of the control plane network element or the user plane network element in the present invention may be a central processing unit (CPU), a general purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute examples of various logical blocks, modules, and circuits described in the content disclosed in the present invention. The processor may be a combination implementing a computing function, for example, a combination including one or more microprocessors, or a combination of a DSP and a microprocessor.

The methods or algorithm steps that are described with reference to the content disclosed in the present invention may be implemented in a hardware manner, or may be implemented in a manner of executing a software instruction by a processor. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or a storage medium in any other forms well-known in the art. A storage medium used as an example is coupled to the processor, so that the processor can read information from the storage medium, and can write information into the storage medium. Certainly, alternatively, the storage medium may be a part of the processor. The processor and the storage medium may be located in an ASIC. In addition, the ASIC may be located in the control plane network element or the user plane network element. Certainly, the processor and the storage medium may also exist in the control plane network element or the user plane network element as discrete components.

A person skilled in the art should be aware that in one or more of the foregoing examples, the functions described in the present invention may be implemented by using hardware, software, firmware, or any combination thereof. When the functions are implemented by software, these functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made based on the technical solutions of the present invention shall fall within the protection scope of the present invention.

What is claimed is:

1. A method comprising:
receiving, by a control plane network element, a delay instruction from a mobility management network element, wherein the delay instruction instructs the control plane network element to delay sending a downlink data notification (DDN) message;

receiving, by a user plane network element, a downlink data packet for a user equipment (UE);

sending, by the user plane network element, an event report message to the control plane network element, wherein the event report message comprises a reported event, and wherein the reported event notifies the control plane network element that the downlink data packet matches no bearer;

determining, by the control plane network element, that the UE is registered in the mobility management network element; and sending, by the control plane network element, the DDN message to the mobility management network element when the control plane network element has not received routing information of a base station from the mobility management network element within a first time period, wherein the routing information of the base station identifies a bearer.

2. The method according to claim 1, wherein the event report message further comprises identifier information, and wherein the identifier information is used to determine that the downlink data packet is for the UE.

3. The method according to claim 1, wherein determining, by the control plane network element, that the UE is registered in the mobility management network element comprises determining based on identifier information that the UE is registered in the mobility management network element, and wherein the identifier information is carried by the event report message.

4. The method according to claim 1, further comprising, after determining, by the control plane network element, that the UE is registered in the mobility management network element:

starting, by the control plane network element, a first timer based on the delay instruction, and configuring a timed duration of the first timer to the first time period based on a delay parameter, wherein the delay instruction comprises the delay parameter; and sending, by the control plane network element, a first indication message comprising the first time period to the user plane network element that has started a second timer, wherein a timed duration of the second timer is a second time period, wherein the first indication message is used, by the user plane network element, to restart the second timer and to configure the timed duration of the second timer to the first time period or is used, by the user plane network element, to configure the timed duration of the second timer to a sum of the second time period and the first time period so that the user plane network element buffers a subsequently received downlink data packet.

5. The method according to claim 4, further comprising, before sending, by the control plane network element, the first indication message comprising the first time period to the user plane network element that has started the second timer, sending, by the control plane network element, a second indication message to the user plane network element, wherein the second indication message instructs the user plane network element to configure the timed duration of the second timer to the second time period so that the user plane network element buffers the downlink data packet within the timed duration of the second timer.

6. The method according to claim 4, further comprising, after starting, by the control plane network element, the first timer based on the delay instruction:

stopping, by the control plane network element, timing of the first timer when the control plane network element has received the routing information of the base station from the mobility management network element within the first time period; and sending the routing information of the base station to the user plane network element; or sending, by the control plane network element, a third indication message to the user plane network element when the control plane network element has not received the routing information of the base station from the mobility management network element within the first time period, wherein the third indication message instructs the user plane network element to stop timing of the second timer and discard the buffered downlink data packet and the buffered subsequently received downlink data packet.

7. The method according to claim 1, further comprising, after receiving, by the user plane network element, the downlink data packet for the UE:

starting, by the user plane network element, a timer, wherein a timed duration of the timer is a second time period; and buffering the downlink data packet within the timed duration of the timer.

8. The method according to claim 7, further comprising, before receiving, by the user plane network element, the downlink data packet for the UE, receiving, by the user plane network element, a second indication message from the control plane network element, wherein the second indication message instructs the user plane network element to configure the timed duration of the timer to the second time period.

9. The method according to claim 7, further comprising, after sending, by the user plane network element, the event report message to the control plane network element:

receiving, by the user plane network element, a first indication message from the control plane network element, wherein the first indication message comprises a first time period;

restarting, by the user plane network element, the timer and configuring the timed duration of the timer to the first time period based on the first indication message, or configuring, by the user plane network element, the timed duration of the timer to a sum of the second time period and the first time period based on the first indication message; and buffering, by the user plane network element, a subsequently received downlink data packet based on the timed duration of the timer.

10. The method according to claim 9, further comprising:

stopping, by the user plane network element, timing of the timer when the user plane network element has received routing information of a base station sent by the control plane network element within the timed duration of the timer; and sending the buffered downlink data packet and the buffered subsequently received downlink data packet to the UE, wherein the routing information of the base station identifies the bearer; or stopping, by the user plane network element, timing of the timer when the user plane network element has received a third indication message sent by the control plane network element within the timed duration of the timer; and discarding the buffered downlink data packet and the buffered subsequently received downlink data packet based on the third indication message.

11. A communications system comprising:
a user plane network element; and
a control plane network element,
wherein the user plane network element is configured to:
   receive a downlink data packet for a user equipment (UE), and
   send an event report message to the control plane network element, wherein the event report message comprises a reported event, and wherein the reported event notifies the control plane network element that the downlink data packet matches no bearer, and
wherein the control plane network element is configured to:
   receive a delay instruction from a mobility management network element, wherein the delay instruction instructs the control plane network element to delay sending a downlink data notification (DDN) message,
   receive the event report message from the user plane network element,
   determine that the UE is registered in the mobility management network element, and
   send the DDN message to the mobility management network element when the control plane network element has not received routing information of a base station from the mobility management network element within a first time period, wherein the routing information of the base station identifies a bearer.

12. The communications system according to claim 11, wherein the event report message further comprises identifier information, and the identifier information is used to determine that the downlink data packet is for the UE.

13. The communications system according to claim 11, wherein the control plane network element is configured to determine, based on identifier information, that the UE is registered in the mobility management network element, and wherein the identifier information is carried by the event report message.

* * * * *